United States Patent Office 2,785,831
Patented Mar. 19, 1957

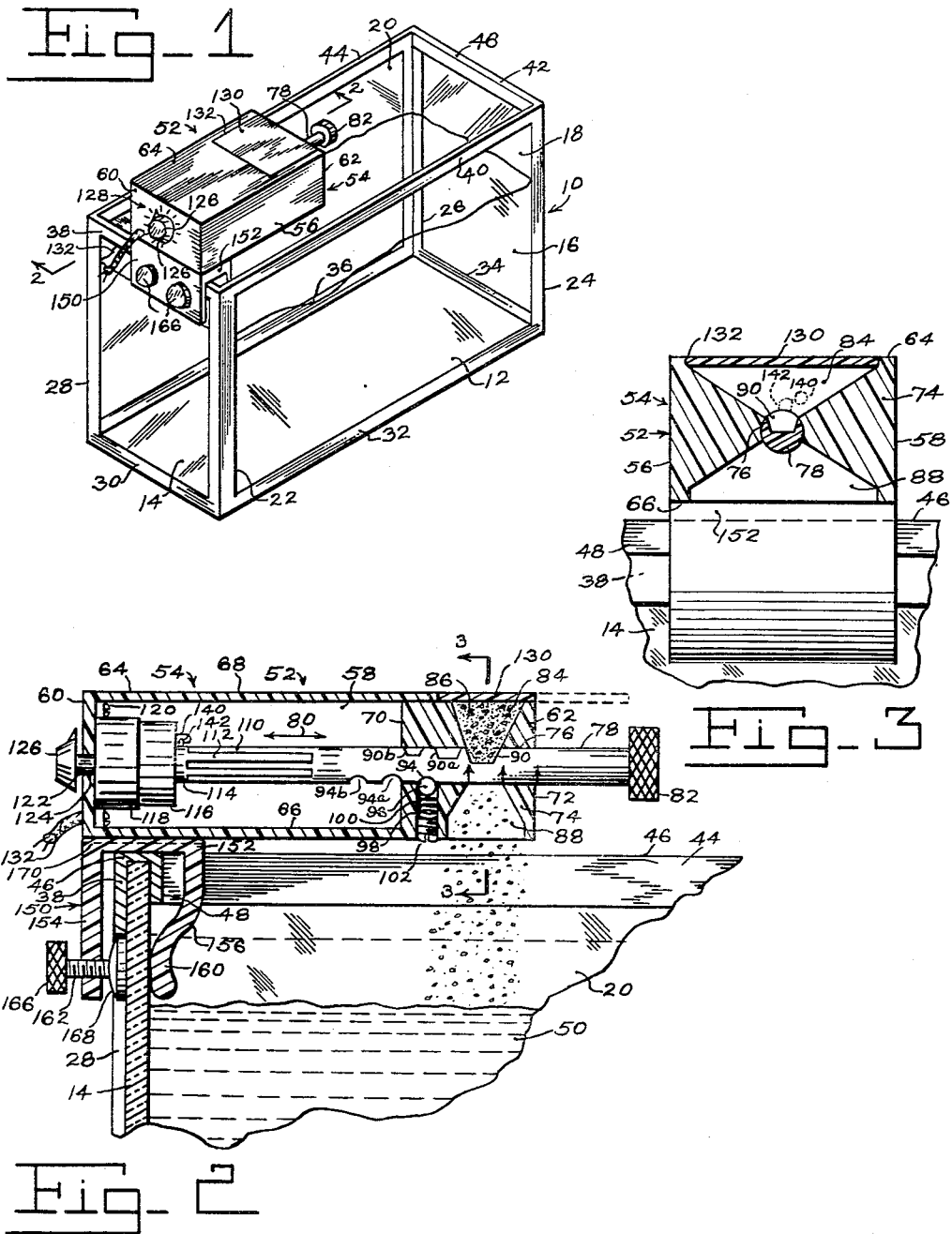

2,785,831

AUTOMATIC FISH FEEDER

Seymour Smolin, New York, N. Y.

Application May 28, 1953, Serial No. 357,970

4 Claims. (Cl. 222—70)

This invention relates to improvements in devices for feeding fishes and other small pets and the like.

An object of the invention is to provide a novel and improved device for feeding fishes and other small pets, in accordance with a predetermined time schedule fitted to their particular needs, without the need for the presence of an operator at the time the feeding is carried out.

Another object of the invention is to provide a novel automatic fish feeding device in which there is a support housing for supporting a quantity of fish food in elevated relationship to the water level in an aquarium or the like, including automatically actuated means for dispensing from said quantity of fish food, a preselected portion dropped onto the surface of the water, at one or more spaced time intervals, such for example, at a predetermined hour each day for several days, or the like.

A further object of the invention is to provide a novel automatic feeding device for fishes and other pets, which includes a hopper for containing a main quantity of food, a dispensing means for distributing predetermined quanties of said food to the fish, timing means for actuating the dispensing means to take from the main bulk supply a predetermined meal portion for the fishes, separate it from the bulk supply, and drop it by gravity force into the water containing the fishes, returning the parts to initial rest position immediately upon feeding the fishes, in readiness for the next succeeding cycle.

Still another object of the invention is to provide a novel and improved automatic fish feeding device which is so constructed that it fits right onto a wall of any aquarium, so as to overlie the water thereof, without the need for structural alteration of the aquarium, or for special tools in fitting it thereto.

Still a further object of the invention is to provide a novel and improved automatic fish feeder which stores adequate fish food for as many days as desired by the operator or user, so that he may be absent for many days, and will know that his fishes will be properly fed during all that time, in accordance with their needs, and without any intervention on his part other than that of initially setting the device as to feeding time and cycle, and of filling the food hopper.

Another object of the invention is to provide a novel and improved automatic fish feeder which can be made of any desired material, including plastics, light metals, composition, or other materials, and which is of simple design, inexpensive to manufacture, and highly efficient and effective for its intended purposes.

These and other objects and advantages of the invention will become apparent from the following description of a preferred embodiment thereof as illustrated in the accompanying drawings, forming a part hereof, and in which, Figure 1 is a perspective view showing an aquarium with my novel device mounted therein in position for use.

Figure 2 is a longitudinal sectional elevational view taken through the device of Figure 1, substantially on plane 2—2 of Figure 1, the view being in fragment, and showing the food regulating shaft fully retracted to the left, so as to bring the larger dispensing recess into dispensing position.

Figure 3 is a fragmentary sectional elevational view taken substantially on plane 3—3 of Figure 2.

In the very popular hobby of keeping pet fishes in a home aquarium, many problems arise in seeing that the fish are well cared for and well fed. Other problems also exist, such as keeping the water at a proper temperature, keeping it pure and free from contamination, and properly aerated, but these are taken care of by means of other devices not the subject of this application. It has been said that over-feeding is the most frequent cause of sickness and death of pet fish in the usual aquarium in the home, and the present invention is intended to make it easier for the hobbyist to see that this does not occur, yet that his fish will remain well fed. When he goes away for a few days, the fish fancier or hobbyist will frequently make the mistake of dumping a large quantity of fish food into the aquarium, hoping that it will last to feed the fish in the meantime, until he returns several days later. However, there is no surer way of injuring the fish than by such procedure, and he may well find on his return that they are either quite ill, or even dead.

Such food as the fish do not eat the same day, will begin to decompose, and give off noxious gases, to harm the fish. In addition, the water itself will become impure due to this contamination, and as a result, various dangerous organisms will have a very good opportunity to thrive in the water, and become a source of danger to the fish. The present invention makes it possible for the fish hobbyist to feed his fish automatically, from a hopper of fish food or the like, from which prescribed quantities of food are dispensed at intervals of once each day, or otherwise, as desired by the owner, for several days in succession, or even for more than a week, if necessary, the food supply being kept in the hopper and in proper condition, so as to avoid spoilage, and fed to the fish only in the required quantities each day, and at the same time or other time desired and predetermined by the owner. This device is also of use for the fish fancier who has a large number of aquaria, which he cannot personally supervise so as to feed the fish in each, every day. In such case, he merely mounts one of my improved devices on each aquarium, and it automatically feeds the fish, without the need for further attention on his part, until the hopper is empty.

In order to understand clearly the nature of the invention, and the best means for carrying it out, reference may now be had to the drawings, in which like numerals denote similar parts throughout the several views.

As shown, there is an aquarium generally indicated at 10, and formed with a floor or bottom wall 12, usually of slate or other similar material, and surmounted by upstanding end walls 14 and 16, of glass, and side walls 18 and 20, also of glass. Metal moldings hold the glass and floor in position, forming upstanding molding corners 22, 24, 26 and 28, integrated with top and bottom mouldings such as 30, 32, 34 and 36, at the bottom, and shown at 38, 40, 42 and 44 at the top. The moldings are joined smoothly together where they abut each other, to form a good solid strong frame for the aquarium. As seen best in Figures 2 and 3, the upper edges of the top moldings are folded at 46 closely over the top edge of the glass sides, such as 16, and folded inwardly downwardly at the marginal portion 48, so as to smoothly and firmly grip the glass, and suitable sealing composition, not shown, may be inserted between the glass and the frame moldings, to further enhance the sealing effect against leakage of the water 50 therepast.

In order to provide a continuous main supply of fish food, from which a suitable portion is dispensed each day, I mount on the aquarium a novel dispensing device generally indicated at 52. According to a preferred form of the invention, the dispensing and storage device includes a housing 54, with side walls 56 and 58 secured to a pair of end walls 60 and 62, and also secured to top and bottom walls 64 and 66. There is thus defined within the housing 54, a chamber 68 to the left of wall surface 70 as seen in Figure 2, and to the right of wall 60.

The wall 62 is thickened to form between surfaces 70 and 72 a massive dispensing casing or block 74, which has a longitudinal bore 76 in which is journaled the distributor or dispensing shaft or rotor member 78, for both rotation and axial sliding motion in the directions of the arrow 80. A knob 82 is carried on the rotor distributor shaft 78, to enable it to be moved as desired. The upper portion of the dispensing block 74 is hollowed out to form an upper food storage and distributing hopper 84 to receive fish food in small particles, or other forms, as seen at 86. At the bottom, the block 74 is also hollowed out to form a guide passageway 88 to allow the food to drop downwards into the aquarium, onto the surface of the water 50 to be consumed by the fishes therein.

A first dispensing cup or recess 90 is formed in the surface of the rotor 78, as shown, being disposed in Figures 1 and 2, and 3, in intersecting underlying position relative to the open lower end of the hopper chamber or recess 84, so as to receive fish food in quantity sufficient to fill the cup 90 from the hopper when the rotor is turned so that the dispensing cup 90 is in uppermost position as shown. It is also seen that the upper end of the distributing passageway 88 is also open but at the top in addition to being open at the bottom, so that when the rotor 78 is turned through one hundred eighty degrees, to bring the dispensing cup 90 into a downwardly facing position, then the contents of the cup 90 fall by gravity force into the aquarium onto the water 50, to feed the fish. By returning the rotor to initial position, with the cup 90 uppermost again, the cup 90 again fills with fish food, and is ready for again being inverted to feed the fish on the next cycle, which is normally the next day.

Additional dispensing cups or recesses 90a and 90b are also formed in the rotor 78, to one side axially of the larger cup 90, these being graduated into smaller and smaller sizes, to take care of smaller fishes as needed, or fewer fishes. Locating hemispheres or recesses 94, 94a, and 94b are also formed in the undersurface of the rotor 78, as seen best in Figure 2, to receive the locating detent or ball 96, which is carried in a radial bore 98 in block 74, with the ball 96 being biased radially inwardly by the spring 100, and held in position by the threaded plug 102. From this it is seen that to bring a smaller dispensing cup or recess, such as 90a into position beneath the hopper 84, it is only necessary to pull on the knob 82, to the right, releasing the stop recess 94 from the ball 96, and bringing the shaft 78 over to the right until the ball 96 engages in recess 94a, at which time the dispensing cup 90a is in position to receive food from the hopper and dispense it to the aquarium. Similarly, to bring the smallest dispensing cup 90b into dispensing position, it is only necessary to pull the knob 82 still further to the right in the same manner.

The left end of the rotor shaft 78 is formed with splines 110 which slidingly engage with matching splines 112 formed in the right hand end of the motor shaft 114, of the motor or engine 116. A control box 118 carries the motor 116 and in turn is carried by flanges 120 on the inside of wall 60, being fixed against turning. A control shaft 122 extends out of the control box 118, and penetrates through an opening 124 in wall 60, carrying a knob 126 on its outer end for turning therewith. Graduations 128 are formed or carried on wall 60 around knob 126, to indicate its angular position. Such graduations may indicate the time of day at which the fish are to be fed, or other notation to guide the operator in setting the controls.

The splines intermating as seen at 110 and 112 in Figure 2, permit the free movement of the rotor shaft 78 to the right or left as per the arrow 80, without movement axially of either the motor 116 or the control box 118. A cover 130 is slidably carried in grooves formed in the margins of the opening 132 in the top wall 64 of the housing, so that the user may have access to the interior of the hopper 84 when desired, to inspect the quantity of food therein, or to add more, or remove some. The cover may also be made of clear plastic or glass, as seen at 130, to permit inspection right through the cover without removal thereof, to see how much food remains.

The motor 116 may be of any suitable small type, such as the type commonly used in powering electric clocks, and timed mechanisms, being actuated by electrical energy supplied from a battery or the power lines through wires 132. The motor is thus connected to the electric power lines through a switch inserted in the wires 132, so that at a predetermined time each day, the switch is closed, allowing the motor to turn, and thus rotating the shaft 78 once, through a complete revolution only. The food in the recess 90 is thus dropped into the aquarium, and the shaft or rotor turns to return the recess 90 back to its topmost initial position and then stops. To accomplish this, the control box 118 contains an electric clock also actuated from the electric power lines, and constantly turning at all times.

A micro-switch inside the control box 118, inserted in the circuit between the motor 116 and the wires 132, is normally open, and closes only when a cam in the electric clock works, is brought into contact with the plunger of the micro-switch. When this cam contacts the plunger, the micro-switch is closed, turning on the motor 116 for one revolution. The micro-switch has an extension 140 which is in the path of the pin 142a carried on and turnable with the shaft 114 of the motor 116. The motor thus turns through one revolution, dumping the recess 84 of its contents, and then when it returns to top position, the pin 142 trips lever 140 and thus opens the micro-switch again, which opens the circuit to the motor 116, stopping its motion. When the clockwork in housing 118 again the next day, reaches this same time, the micro-switch is again closed, allowing the turning of rotor 78 to dump the food into the water, and after one revolution, the pin 142 against lever 140 opens the micro-switch, and turns off the motor 116.

In order to mount the device on the aquarium, I provide a preferred form of bracket 150, which has a web 152 extending across the upper edge 46 of the molding of the aquarium frame. Walls 154 and 156 extend integrally downwardly from opposite sides of the web 152, so as to come on opposite sides of the glass 14. The lower portion of wall 156 is bent in at 160 to resiliently bear against the inner surface of the glass, and on the lower portion of wall 154, I provide one or more set screws 162 threaded through the wall 154, with a knob 166 on their outer end, and a suction cup 168 of rubber on the inner end of the screw, to grip the glass surface. Turning the knob tightens the grip of the device, and provides a firm mounting for the housing 52. The housing 52 may be secured to the bracket web 152, or made integral therewith, and may be slidably removable if a dovetail groove 170 is formed in the web 152 and the lower portion of wall 66 of the housing is ribbed for engagement therewith.

Although I have described my invention in specific terms, it will be understood that various changes may be made in size, shape, materials and arrangement without departing from the spirit and scope of the invention as claimed.

It will also be understood that the knob 128 may be employed to pre-set the cam position mentioned above, as needed. The clockwork motor in housing 118 may also be constructed to turn the shaft 78 directly, through the splines 110 and 112, omitting the use of the motor 116, according to another form of the invention. As seen in Figure 2, graduations in the form of upwardly pointing arrows may be shown on the shaft 78, near or intended for registry with the outer portion of wall 62, so that the particular size of dumping recess 90, 90a, or 90b which is in operative position may be ascertained readily by the user by inspection. To further condition the fish feeding operation to the fishes themselves, the circuit may also include an electric bell, connected so that when the shaft 78 is turned to food dumping position, dumping the food into the aquarium, the circuit is completed through the bell, so as to make it ring, and the audible sound each day at feeding time will condition the fishes so that on hearing the bell they will know that it is feeding time, and will come for their food.

I claim:

1. A device for feeding fishes and other aquatic life, comprising a relatively stationary housing adapted to extend over the interior of an aquarium or the like, a feeding shaft journaled in said housing for turning about a horizontal axis, a hopper in said housing for receiving a quantity of food, and having an outlet opening opening upon said feeding shaft, said shaft having a plurality of axially spaced receptacles formed therein and arranged for being moved axially to bring any selected one of said receptacles into registry with said outlet opening of said hopper to receive food therefrom, said shaft being split intermediate its ends, into two shaft sections, said shaft sections being formed with intermating splines at their engaging ends, so that they are retained in mutual turning engagement although axially mutually displaced from full spline interengagement, for adjustably registering any receptacle with said hopper outlet opening, said receptacles being graduated in cubic content, whereby food is receivable into any predetermined one of said receptacles, said housing having a food discharge opening disposed so as to receive the contents of any such receptacle recess when said shaft is turned about its axis to bring said receptacle into registry with said food discharge opening, whereby said food is dumped by gravity into said aquarium or the like to feed the inhabitants thereof, and means for actuating said shaft in accordance with a predetermined feeding pattern and timing schedule, said means for actuating said shaft comprising motor means connected to an end of said shaft section remote from said shaft section which carries said plurality of receptacles, and control means for regulating the timing of operation of said motor and the angular traverse thereof.

2. A device for feeding fishes and other aquatic life, comprising a relatively stationary housing adapted to extend over the interior of an aquarium or the like, a feeding shaft journaled in said housing for turning about a horizontal axis, a hopper in said housing for receiving a quantity of food, and having an outlet opening opening upon said feeding shaft, said shaft having a plurality of axially spaced receptacles formed therein and arranged for being moved axially to bring any selected one of said receptacles into registry with said outlet opening of said hopper to receive food therefrom, said receptacles being graduated in cubic content, whereby food is receivable into any predetermined one of said receptacles, said housing having a food discharge opening disposed so as to receive the contents of any such receptacle recess when said shaft is turned about its axis to bring said receptacle into registry with said food discharge opening, whereby said food is dumped by gravity into said aquarium or the like to feed the inhabitants thereof, means for actuating said shaft in accordance with a predetermined feeding pattern and timing schedule, said plurality of receptacles in said feeding shaft being formed in a series extending axially longitudinally along said feeding shaft, and releasable detent means for stopping said shaft therealong to indicate the registry of any particular receptacle with said outlet opening of said hopper.

3. A device for feeding fishes and other aquatic life, comprising a relatively stationary housing adapted to extend over the interior of an aquarium or the like, a feeding shaft journaled in said housing for turning about a horizontal axis, a hopper in said housing for receiving a quantity of food, and having an outlet opening opening upon said feeding shaft, said shaft having a plurality of axially spaced receptacles formed therein and arranged for being moved axially to bring any selected one of said receptacles into registry with said outlet opening of said hopper to receive food therefrom said receptacles being graduated in cubic content, whereby food is receivable into any predetermined one of said receptacles, said housing having a food discharge opening disposed so as to receive the contents of any such receptacle recess when said shaft is turned about its axis to bring said receptacle into registry with said food discharge opening, whereby said food is dumped by gravity into said aquarium or the like to feed the inhabitants thereof, means for actuating said shaft in accordance with a predetermined feeding pattern and timing schedule, said plurality of receptacles in said feeding shaft being formed in a series extending axially along said shaft, releasable detent means for stopping said shaft therealong to indicate registry of any particular receptacle with said outlet opening of said hopper to receive food therefrom, and means for blocking filling of any other of said receptacles when said predetermined receptacle is turned to dumping position.

4. A device for feeding fishes and other aquatic life, comprising a walled casing forming an aquarium or the like, a relatively stationary housing adapted to extend over the interior of said aquarium or the like, bracket means carried by said housing for engaging a wall of said aquarium, clamp means acting between said bracket means and said aquarium wall, for holding said bracket means and said housing securely in engagement with said walled casing, and comprising a shaft threaded through said bracket means, and suction cup means carried by said shaft and constructed and arranged for being brought into prehensile suction engagement with said walled casing of said aquarium, to maintain secure engagement therewith, a feeding shaft journaled in said housing for turning about a horizontal axis, a hopper in said housing for receiving a quantity of food, and having an outlet opening opening upon said feeding shaft, said shaft having a plurality of axially spaced receptacles formed therein and arranged for being moved axially to bring any selected one of said receptacles into registry with said outlet opening of said hopper to receive food therefrom, said receptacles being graduated in cubic content, whereby food is receivable into any predetermined one of said receptacles, said housing having a food discharge opening disposed so as to receive the contents of any such receptacle recess when said shaft is turned about its axis to bring said receptacle into registry with said food discharge opening, whereby said food is dumped by gravity into said aquarium or the like to feed the inhabitants thereof, and means for actuating said shaft in accordance with a predetermined feeding pattern and timing schedule.

References Cited in the file of this patent

UNITED STATES PATENTS

| Number | Name | Date |
| --- | --- | --- |
| 735,167 | Steinberg | Aug. 4, 1903 |
| 742,414 | Hale | Oct. 27, 1903 |
| 742,415 | Hale | Oct. 27, 1903 |
| 742,969 | Clapp | Nov. 3, 1903 |
| 848,101 | Hale | Mar. 26, 1907 |
| 1,869,120 | Thoeming et al. | July 26, 1932 |
| 1,989,298 | Tingley | Jan. 29, 1935 |
| 2,060,386 | Stargardt | Nov. 10, 1936 |
| 2,242,093 | Stauffacher | May 13, 1941 |
| 2,322,866 | Merz | June 29, 1943 |
| 2,538,413 | Chard | Jan. 16, 1951 |
| 2,569,421 | Larson | Sept. 25, 1951 |
| 2,598,977 | Dale et al. | June 2, 1952 |
| 2,700,489 | Sheft | Jan. 25, 1955 |
| 2,725,852 | Cramer | Dec. 6, 1955 |